United States Patent [19]

Orikasa et al.

[11] Patent Number: 5,204,405
[45] Date of Patent: Apr. 20, 1993

[54] THERMOPLASTIC RESIN COMPOSITION AND METHOD FOR PREPARING THE SAME

[75] Inventors: Yuichi Orikasa, Yokohama; Suehiro Sakazume, Fujisawa, both of Japan

[73] Assignees: Nippon Petrochemicals Co., Ltd.; Nippon Oil & Fats Co., Ltd., Japan

[21] Appl. No.: 684,140

[22] Filed: Apr. 11, 1991

Related U.S. Application Data

[63] Continuation of Ser. No. 432,925, Nov. 7, 1989.

[30] Foreign Application Priority Data

Nov. 9, 1988 [JP] Japan ................. 63-283091

[51] Int. Cl.⁵ ................. C08G 63/91; C08L 81/04
[52] U.S. Cl. ................. 525/64; 525/189
[58] Field of Search ................. 525/189, 64

[56] References Cited

U.S. PATENT DOCUMENTS

| | | | |
|---|---|---|---|
| 4,355,059 | 10/1982 | Blackwell | 525/189 |
| 4,436,865 | 3/1984 | Beever | 525/64 |
| 4,657,971 | 4/1987 | Shiraki et al. | 525/64 |
| 4,748,169 | 5/1988 | Izutsu et al. | 525/189 |
| 4,889,893 | 12/1989 | Kobayashi et al. | 525/189 |
| 4,962,148 | 10/1990 | Orikasa et al. | 525/64 |
| 4,983,663 | 1/1991 | Orikasa et al. | 525/64 |
| 4,987,165 | 1/1991 | Orikasa et al. | 525/189 |

FOREIGN PATENT DOCUMENTS

| | | | |
|---|---|---|---|
| 0158989 | 4/1985 | European Pat. Off. | |
| 228268 | 7/1987 | European Pat. Off. | 525/189 |
| 0277608 | 1/1988 | European Pat. Off. | |
| 0305539 | 3/1988 | European Pat. Off. | |
| 295706 | 12/1988 | European Pat. Off. | 525/64 |
| 0327300 | 1/1989 | European Pat. Off. | |
| 0338303 | 10/1989 | European Pat. Off. | |
| 172057 | 7/1987 | Japan | 525/64 |
| WO886610 | 3/1988 | World Int. Prop. O. | |

Primary Examiner—Melvyn I. Marquis
Assistant Examiner—Helen F. Lee
Attorney, Agent, or Firm—Ostrolenk, Faber, Gerb & Soffen

[57] ABSTRACT

A novel thermoplastic resin composition is here disclosed which comprises (I) 99 to 1% by weight of a polyolefin, (II) 1 to 99% by weight of a polyarylene sulfide, (III) 0.1 to 100 parts by weight, based on 100 parts by weight of the components (I)+(II), of a multi-phase structure thermoplastic resin which is composed of 5 to 95% by weight of an olefin polymer or copolymer and 95 to 5% by weight of a vinyl polymer or copolymer obtained from at least one kind of vinyl monomer, either of both the components being in the state of a dispersion phase having a particle diameter of 0.001 to 10 μm, and (IV) 0 to 150 parts of an inorganic filler based on 100 parts by weight of the components (I)+(II)+(III).

Furthermore, a method for preparing the aforesaid composition is also disclosed here.

8 Claims, No Drawings

THERMOPLASTIC RESIN COMPOSITION AND METHOD FOR PREPARING THE SAME

This is a continuation of application Ser. No. 07/432,925 filed on Nov. 7, 1989.

BACKGROUND OF THE INVENTION (1) Field of the Invention

The present invention relates to a thermoplastic resin composition having excellent heat resistance and impact resistance and a method for preparing the same. This composition of the present case can be widely utilized as materials for electrical and electronic machine parts, automobile parts and the like.

(2) Description of the Prior Art

Polyolefins are widely used for the manufacture of various molded articles because of their excellent moldability impact resistance, chemical resistance and water resistance, and because of being economical. However, the polyolefins have the drawback that they are poor in heat resistance and flame retardance, and for this reason, applications of these polyolefins are limited.

On the other hand, polyarylene sulfides are excellent in heat resistance, mechanical properties, dimensional stability and flame retardance, but they are poor in molability and impact resistance. Therefore, restriction is put on uses of these polyarylene sulfides at times.

If a better thermoplastic resin composition is obtained in which features of the polyolefin and the polyarylene sulfide can compensate for drawbacks of each, new applications will be expected.

However, the compatibility of the polyolefin with the polyarylene sulfide is extremely bad, since their chemical structures are different from each other.

Heretofore, examples of alloys comprising both the resins are scarcely known.

Japanese Patent Laid-open Publication Nos. 153343/1987, 153344/1987 and 153345/1987 disclose methods for blending, with a polyarylene sulfide, an olefin copolymer as an impact resistance improver containing essential components which are an α-olefin and an α,β-unsaturated glycidyl ester, but these methods do not exert a satisfactory effect.

An object of the present invention is to heighten the compatibility of the polyolefin with the polyarylene sulfide with the intention of alloying them.

SUMMARY OF THE INVENTION

The inventors of the present application have intensively researched to solve the above-mentioned problem, and as a result, they have found that when a specific multiphase structure thermoplastic resin as a compatibilizing agent is mixed with a polyolefin and an polyarylene sulfide, the compatibility of the polyolefin with the polyarylene sulfide can be improved. In consequence, a thermoplastic resin composition has been accomplished which simultaneously the excellent moldability, impact resistance and chemical resistance of the polyolefin as well as the excellent heat resistance and flame retardance of the polyarylene sulfide.

That is, the first aspect of the present invention is directed to a thermoplastic resin composition prepared by blending (I) 99 to 1% by weight of a polyolefin, with (II) 1 to 99% by weight of a polyarylene sulfide, (III) 0.1 to 100 parts by weight, based on 100 parts by weight of the aforesaid components (I)+(II), of a multi-phase structure thermoplastic resin which is composed of 5 to 95% by weight of an olefin polymer or copolymer and 95 to 5% by weight of a vinyl polymer or copolymer obtained from at least one kind of vinyl monomer, either or both the components being in the state of a dispersion phase having a particle diameter of 0.001 to 10 μm, and (IV) 0 to 150 parts of an inorganic filler based on 100 parts by weight of the aforesaid components (I)+(II)+(III).

The second aspect of the present invention is directed to a method for preparing a thermoplastic resin composition which comprises the step of melting and mixing a polyolefin (I) and a polyarylene sulfide (II) with 1 to 100% by weight of a graft polymerization precursor (A) which is obtained by first adding at least one kind of vinyl monomer, at least one kind of radical polymerizable or copolymerizable organic peroxide and a radical polymerization initiator to an aqueous suspension of an olefin polymer or copolymer, then heating the suspension under such conditions that the decomposition of the radical polymerization initiator does not occur substantially, in order to impregnate the olefin copolymer with the vinyl monomer, radical polymerizable or copolymerizable organic peroxide and radical polymerization initiator, and raising the temperature of this aqueous suspension, when the degree of the impregnation has reached 50% by weight or more of the original total weight of the vinyl monomer, peroxide and initiator, in order to copolymerize the vinyl monomer with the radical polymerizable or copolymerizable organic peroxide in the olefin copolymer, 0 to 99% by weight of an olefin polymer or copolymer (B), and 0 to 99% by weight of a vinyl polymer or copolymer (C) obtained by polymerizing at least one kind of vinyl monomer, or alternatively melting and mixing the components (A), (B) and (C) previously at a temperature in the range of 200 to 300° C. to form a multi-phase structure thermoplastic resin (III), and then melting and mixing the resin (III) with the resins (I) and (II).

DETAILED DESCRIPTION OF THE INVENTION

Examples of the polyolefin (I) used in the present invention include homopolymers and copolymers of various olefins such as polypropylene, propylene/ethylene copolymer, ethylene/propylene/diene methylene linkage, polybutene-1, propylene-butene-1 copolymer, poly-4-methylpentene-1, low-density polyethylene and high-density polyethylene. Above all, polypropylene is preferably used.

The polyarylene sulfide resin used in the present invention is a polymer represented by the general formula

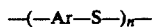

wherein Ar is a divalent aromatic residue containing at least one carbon six-membered ring such as

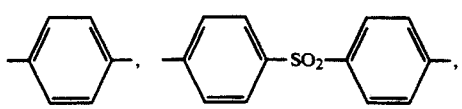

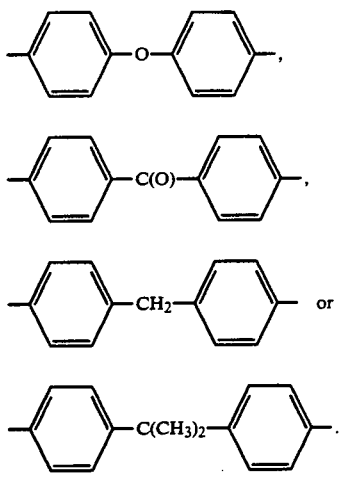

Furthermore, the above-mentioned aromatic ring may have a substituent such as F, Cl, Br or CH₃. The particularly typical one is a polyarylene sulfide (hereinafter referred to as PPS) represented by the general formula

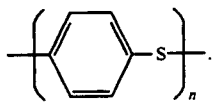

A method for preparing PPS is disclosed in Japanese Patent Publication No. 3368/1979. That is, PPS may be prepared by reacting paradichlorobenzene with sodium sulfide at a temperature of 160° to 250° C. under pressure in an N-methylpiloridone solution.

In the present invention, a blend ratio of the component (I) to the component (II) depends upon the utilization purpose of the composition.

That is, if it is intended that the features of the polyolefin are maintained and heat resistance which is a drawback of the polyolefin is improved, the amount of the polyolefin is required to be 50 to 99% by weight, preferably 60 to 95% by weight.

This reason is as follows: When the amount of the polyolefin is less than 50% by weight, moldability and impact resistance which are the features of the polyolefin are impaired, and when it is more than 99% by weight, the improvement effect of heat resistance which is one object of the present invention cannot be expected.

Furthermore, if it is intended that the features of the polyarylene sulfide are maintained and moldability and impact resistance are improved, the amount of the polyarylene sulfide is required to be 50 to 99% by weight, preferably 60 to 95% by weight.

When the amount of the polyolefin is less than 50% by weight, heat resistance and mechanical properties which are the features of the polyarylene sulfide are impaired, and when it is more than 99% by weight, the improvement effect of moldability which is one object of the present invention cannot be expected.

The olefin polymer or copolymer used in the multi-phase structure thermoplastic resin of the present invention is at least one kind of olefin copolymer selected from the group consisting of non-polar α-olefin copolymers, epoxy group-containing ethylene copolymers, ethylene/unsaturated carboxylic acid or its alkyl ester copolymers or metallic salts thereof, and ethylene/vinyl ester copolymers.

The non-polar α-olefin copolymer is a polymer prepared by polymerizing or copolymerizing one or more kinds of α-olefin monomers and an unconjugated diene monomer. Here, examples of the α-olefin monomers include ethylene, propylene, butene-1, 4-methylpentene-1, hexene-1, decene-1 and octene-1. Examples of the unconjugated diene monomer include ethylidenenorbornene, 1,4-hexadiene and dicyclopentadiene.

Typical examples of the above-mentioned non-polar α-olefin copolymer include homopolymers such as low-density polyethylenes, high- and medium-density polyethylenes, polypropylene, polybutene-1, poly-4-methylpentene-1; copolymers of ethylene and an α-olefin having 3 to 12 carbon atoms such as ethylene/propylene copolymer, ethylene/-butene-1 copolymer, ethylene/-hexene-1 copolymer and ethylene/octene-1 copolymer; ethylene/propylene copolymer rubber, ethylene/-propylene/ethylidenenorbornene copolymer rubber, ethylene/propylene/1,4-hexadiene copolymer rubber and ethylene/propylene/dicyclopentadiene copolymer rubber. Above all, the preferable non-polar α-olefin copolymers are the low-density ethylene polymer and copolymer having a density of 0.85 to 0.94 g/cm³, the ethylene-propylene copolymer rubber having a Mooney viscosity of 15 to 90 and the ethylene-propylene-diene copolymer rubber having a Mooney viscosity of 15 to 12 and an iodine value of 4 to 30.

Here, the Mooney viscosity is a value obtained in accordance with JIS K-6300 (100° C.).

The epoxy group-containing ethylene copolymer used in the multi-phase structure thermoplastic resin regarding the present invention is a copolymer of ethylene formed by a high-pressure radical polymerization and an unsaturated glycidyl group-containing monomer, or a terpolymer of ethylene, an unsaturated glycidyl group-containing monomer and another unsaturated monomer, or a multicomponent copolymer. The preferable copolymer comprises 60 to 99.5% by weight of ethylene, 0.5 to 40% by weight of the glycidyl group-containing monomer and 0 to 39.5% by weight of another unsaturated monomer.

Examples of the unsaturated glycidyl group-containing monomer include glycidyl acrylate, glycidyl methacrylate, itaconic acid monoglycidyl ester, butenetricarboxylic acid monoglycidyl ester, butenetricarboxylic acid diglycidyl ester, butenetricarboxylic acid triglycidyl ester, vinyl glycidyl ethers and glycidyl esters of maleic acid, crotonic acid and fumaric acid, allyl glycidyl ether, glycidyloxy ethylvinyl ether, glycidyl ethers such as styrene p-glycidyl ether, and p-glycidyl styrene. The particularly preferable ones are glycidyl methacrylate and allyl glycidyl ether.

Other examples of the unsaturated monomers include olefins, vinyl esters, α,β-ethylenic unsaturated carboxylic acids and their derivatives. Typical examples of such unsaturated monomers include olefins such as propylene, butene-1, hexene-1, decene-1, octene-1 and styrene, vinyl esters such as vinyl acetate, vinyl propionate and vinyl benzoate, acrylic acid, methacrylic acid, esters such as methyl, ethyl, propyl, butyl, 2-ethylhexyl, cyclohexyl, dodecyl and octadecyl acrylates and methacrylates, maleic acid, maleic anhydride, itaconic acid, fumaric acid, maleic monoesters and diesters, vinyl ethers such as vinyl chloride, vinyl methyl ether and vinyl ethyl ether, and acrylic amide compounds. Particularly, acrylic and methacrylic esters are preferable.

Other examples of the ethylene copolymer which is usable in the present invention include a copolymer obtained by adding the above-mentioned unsaturated carboxylic acid such as acrylic acid, maleic acid or maleic anhydride to a low-, medium- or high-density polyethylene or ethylene-$\alpha$-olefin copolymer in order to perform modification, and an ion-crosslinked ethylene copolymer obtained by reacting the above-mentioned random or added/modified copolymer with a metallic compound of a metal having a valence of 1 to 3 in the group I, II, III, IVa or VI of the periodic table.

Suitable examples of the above-mentioned metallic compound include nitrates, acetates, oxides, hydroxides, methoxides, ethoxides, carbonates and bicarbonates of the above-defined metals.

Examples of the metallic ions of the metallic compounds include $Na^+$, $K^+$, $Ca^{++}$, $Mg^{++}$, $Zn^+$, $Ba^{++}$, $Fe^{++}$, $Fe^{+++}$, $Co^{++}$, $Ni^{++}$ and $Al^{+++}$. Above all, $Na^+$, $Mg^{++}$ and $Zn^{++}$ are particularly preferable. These various metallic compounds can be also used in combination, when desired.

Typical examples of the epoxy group-containing ethylene copolymer include ethylene/glycidyl methacrylate copolymer; ethylene/vinyl acetate-glycidyl methacrylate copolymer; ethylene/ethyl acrylate/glycidyl methacrylate copolymer; ethylene/carbon monoxide/glycidyl methacrylate copolymer; ethylene/glycidyl acrylate copolymer; and ethylene/vinyl acetate-glycidyl acrylate copolymer. Above all, ethylene/glycidyl methacrylate copolymer, ethylene/ethyl acrylate/glycidyl methacrylate copolymer and ethylene/vinyl acetate/glycidyl methacrylate copolymer are preferred.

These epoxy group-containing olefin copolymers can be also used in a mixture thereof.

The epoxy group-containing olefin copolymer may be prepared by a high-pressure radical polymerization, i.e., by simultaneously or stepwise contacting and polymerizing a monomer mixture of 60 to 99.5% by weight of the above-mentioned ethylene, 0.5 to 40% by weight of one or more unsaturated glycidyl group-containing monomer, and 0 to 39.5% by weight of at least one other unsaturated monomer in the presence of 0.0001 to 1% by weight of a radical polymerization initiator based on the total weight of all the monomers at a polymerization pressure of 500 to 4,000 kg/cm$^2$, preferably 1,000 to 3,500 kg/cm$^2$, at a reaction temperature of 50° to 400° C., preferably 100 to 350° C., using a chain transfer agent and, if necessary, some auxiliaries in an autoclave or tubular reactor.

Examples of the above-mentioned radical polymerization initiator include usual initiators such as peroxides, hydroperoxides, azo-compounds, amine oxide compounds and oxygen.

Examples of the chain transfer agent include hydrogen, propylene, butene-1, saturated aliphatic hydrocarbons having 1 to 20 carbon atoms such as methane, ethane, propane, butane, isobutane, n-hexane, n-heptane and cycloparaffins; halogen-substituted hydrocarbons such as chloroform and carbon tetrachloride; saturated aliphatic alcohols such as methanol, ethanol, propanol and isopropanol; saturated aliphatic carbonyl compounds having 1 to 20 or more carbon atoms such as carbon dioxide, acetone and methyl ethyl ketone; and aromatic compounds such as toluene, diethylbenzene and xylene.

Additional examples of the epoxy group-containing olefin copolymer of the present invention include modified compounds prepared by the addition reaction of the above-mentioned unsaturated glycidyl group-containing monomers to conventional ethylene homopolymers and copolymers.

Examples of the above-mentioned ethylene polymer include low-density, medium-density and high-density polyethylenes, copolymers mainly comprising ethylene and another $\alpha$-olefin such as ethylene/propylene copolymer, ethylene/butene-1 copolymer, ethylene/hexene-1 copolymer, ethylene/4-methylpentene-1 copolymer and ethylene/octene-1 copolymer, copolymers with esters such as ethylene/vinyl acetate copolymer, ethylene/acrylic acid copolymer, ethylene/methacrylic acid copolymer, copolymers of ethylene and methyl, ethyl, propyl, isopropyl and butyl acrylate and methacrylate, ethylene-maleic acid copolymer, ethylene-propylene copolymer rubber, ethylene-propylene-diene-copolymer rubber, liquid polybutadiene, etylene-vinyl acetate-vinyl chloride copolymer and mixtures thereof.

Typical examples of the vinyl polymer and copolymer in the multi-phase structure thermoplastic resin used in the present invention include polymers and copolymers prepared by polymerizing one or more of vinyl monomers such as vinyl aromatic monomers, for example, styrene, nucleus-substituted styrenes such as methylstyrene, dimethylstyrene, ethylstyrene, isopropylstyrene and chlorostyrene, $\alpha$-substituted styrene such as $\alpha$-methylstyrene and a-ethylstyrene; alkyl ester monomers having 1 to 7 carbon atoms of acrylic acid and methacrylic acid such as methyl, ethyl, propyl, isopropy and butyl acrylates and methacrylates; acrylonitrile and methacrylonitrile monomers, vinyl ester monomers such as vinyl acetate and vinyl propionate; acrylamide and methacrylamide monomers; and monoesters and diesters of maleic anhydride and maleic acid. Above all, the vinyl polymers and copolymers containing 50% by weight or more of the vinyl aromatic monomers are most preferable.

The multi-phase structure thermoplastic resin used in the present invention is an olefin copolymer or a vinyl polymer or copolymer matrix in which another vinyl polymer or copolymer or olefin copolymer is uniformly dispersed in a spherical form.

The polymer dispersed in the multi-phase structure thermoplastic resin has a particle diameter of 0.001 to 10 $\mu$m, preferably 0.01 to 5 $\mu$m. When the particle diameter of the dispersed polymer is less than 0.001 $\mu$m or is more than 10 $\mu$m, the compatibility of the polyolefin with the polyarylene sulfide is insufficient, so that impact resistance deteriorates and delamination occurs.

The vinyl polymer or copolymer in the multi-phase thermoplastic resin (III) used in the present invention has a number average polymerization degree of 5 to 10,000, preferably 10 to 5,000.

When the number average polymerization degree is less than 5, heat resistance of the thermoplastic resin composition regarding the present invention deteriorates unpreferably, though impact resistance can be improved. Inversely, when it is in excess of 10,000, melting viscosity is high, moldability deteriorates, and surface gloss falls off unpreferably.

The multi-phase thermoplastic resin used in the present invention comprises 5 to 95% by weight, preferably 20 to 90% by weight of the olefin polymer or copolymer and 95 to 5% by weight, preferably 80 to 10% by weight of the vinyl polymer or copolymer.

When the content of the olefin polymer or copolymer is less than 5% by weight, the compatibility with the polyarylate resin is unpreferably insufficient. When it is more than 95% by weight, heat resistance and dimensional stability of the blend are impaired unpreferably.

As a grafting technique used to prepare the multiphase structure thermoplastic resin regarding the present invention, there may be employed a well known process such as a chain transfer process and an ionizing radiation process, but the following process is most preferable, because grafting efficiency is high, secondary cohesion due to heat does not occur, and therefore performance can be exerted effectively.

Now, a method for preparing the thermoplastic resin composition of the present invention will be described in detail.

That is, water is suspended in 100 parts by weight of an olefin polymer or copolymer. Afterward, 5 to 400 parts by weight of at least one vinyl monomer is added to the suspension, and in the mixture, a solution is poured in which there are dissolved 0.1 to 10 parts by weight, based on 100 parts by weight of the vinyl monomer, of one or a mixture of radical polymerizable or copolymerizable organic peroxides represented by the undermentioned general formula (a) or (b) and 0.01 to 5 parts by weight, based on 100 parts by weight of the total of the vinyl monomer and the radical polymerizable or copolymerizable organic peroxide, of a radical polymerization initiator in which a decomposition temperature to obtain a half-life period of 10 hours is from 40° to 90° C. The mixture is then heated under conditions that the decomposition of the radical polymerization initiator does not occur substantially, in order to impregnate the olefin polymer or copolymer with the vinyl monomer, the radical polymerizable or copolymerizable organic peroxide and the radical polymerization initiator. When the impregnation ratio has reached 50% by weight or more of the original total weight of the monomer, peroxide and initiator, the temperature of this aqueous suspension is raised to copolymerize the vinyl monomer with the radical polymerizable or copolymerizable organic peroxide in the olefin polymer or copolymer, thereby obtaining a graft polymerization precursor (A). Afterward, this graft polymerization precursor (A) is kneaded under melting at 100° to 300° C to prepare the multi-phase structure thermoplastic resin of the present invention. At this time, the graft polymerization precursor may be mixed with the olefin polymer or copolymer or the vinyl polymer or copolymer (C) and the mixture may be then kneaded under melting in order to similarly obtain the multi-phase structure thermoplastic resin.

Moreover, the above-mentioned polymerization precursor (A) also is the multi-phase structure thermoplastic resin. Therefore, the graft polymerization precursor may be directly melted and mixed with the polyolefin and the polyarylene sulfide.

Most preferable is the multi-phase structure thermoplastic resin obtained by kneading the graft polymerization precursor.

The above-mentioned radical polymerizable or copolymerizable organic peroxide is a compound represented by the general formula (a):

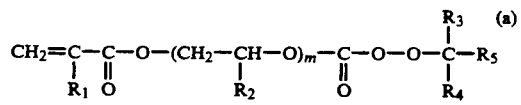

wherein $R_1$ is a hydrogen atom or an alkyl group having 1 or 2 carbon atoms, $R_2$ is a hydrogen atom or a methyl group, each of $R_3$ and $R_4$ is an alkyl group having 1 to 4 carbon atoms, $R_5$ is an alkyl group having 1 to 12 carbon atoms, a phenyl group, an alkyl-substituted phenyl group or a cycloalkyl group having 3 to 12 carbon atoms, and m is 1 or 2.

Alternatively, the radical polymerizable or copolymerizable organic peroxide is a compound represented by the general formula (b):

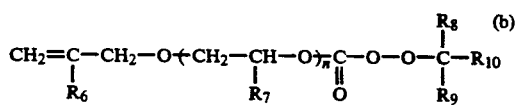

wherein $R_6$ is a hydrogen atom or an alkyl group having 1 or 4 carbon atoms, $R_7$ is a hydrogen atom or a methyl group, each of $R_8$ and $R_9$ is an alkyl group having 1 to 4 carbon atoms, $R_{10}$ is an alkyl group having 1 to 12 carbon atoms, a phenyl group, an alkyl-substituted phenyl group or a cycloalkyl group having 3 to 12 carbon atoms, and n is 0, 1 or 2.

Typical examples of the radical polymerizable or copolymerizable organic peroxides represented by the general formula (a) include t-butylperoxyacryloyloxyethyl carbonate, t-amylperoxyacryloyloxyethyl carbonate, t-hexylperoxyacryloyloxyethyl carbonate, 1,1,3,3-tetramethylbutylperoxyacryloyloxyethyl carbonate, cumylperoxyacryloyloxyethyl carbonate, p-isopropylcumylperoxyacryloyloxyethyl carbonate, t-butylperoxymethacryloyloxyethyl carbonate, t-amylperoxymethacryloyloxyethyl carbonate, t-hexylperoxymethacyloyloxyethyl carbonate, 1,1,3,3-tetramethylbutylperoxymethacryloyloxyethyl carbonate, cumylperoxymethacryloyloxyethyl carbonate, p-isopropylcumylperoxymethacryloyloxyethyl carbonate, t-butylperoxyacryloyloxyethoxyethyl carbonate, t-amylperoxyacryloyloxyethoxyethyl carbonate, t-hexylperoxyacryloyloxyethoxyethyl carbonate, 1,1,3,3-tetramethylbutylperoxyacryloyloxyethoxyethyl carbonate, cumylperoxyacryloyloxyethoxyethyl carbonate, p-isopropylperoxyacryloyloxyethoxyethyl carbonate, t-butylperoxymethacryloyloxyethoxyethyl carbonate, t-amylperoxymethacryloyloxyethoxyethyl carbonate, t-hexylperoxymethacryloyloxyethoxyethyl carbonate, 1,1,3,3-tetramethylbutylperoxymethacryloyloxyethoxyethyl carbonate, cumylperoxymethacryloyloxyethoxyethyl carbonate, p-isopropylcumylperoxymethacryloyloxyethoxyethyl carbonate, t-butylperoxyacryloyloxyisopropyl carbonate, t-amylperoxymacryloyloxyisopropyl carbonate, t-hexylperoxyacryloyloxyisopropyl carbonate, 1,1,3,3-tetramethylbutylperoxyacryloyloxyisopropyl carbonate, cumylperoxyacryloyloxyisopropyl carbonate, p-isopropylperoxyacryloyloxyisopropyl carbonate, t-butylperoxymethacryloyloxyisopropyl carbonate, t-amylperoxymethacryloyloxyisopropyl carbonate, t-hexylperoxymethacryloyloxyisopropyl carbonate, 1,1,3,3-tetramethylbutylperoxymethacryloyloxyisopropyl carbonate, cumylperoxymethacryloyloxyisopropyl carbonate and p-isopropylcumylperoxymethacryloyloxyisopropyl carbonate.

Typical examples of the compounds represented by the general formula (b) include t-butylperoxyallyl carbonate, t-amylperoxyallyl carbonate, t-hexylperoxyallyl carbonate, 1,1,3,3-tetramethylbutylperoxyallyl carbonate, p-menthaneperoxyallyl carbonate, cumylperoxyallyl carbonate, t-butylperoxymethallyl carbonate, t-amylperoxymethallyl carbonate, t-hexylperoxymethallyl carbonate, 1,1,3,3-tetramethylbutylperoxymethallyl carbonate, p-menthaneperoxymethallyl carbonate, cumylperoxymethallyl carbonate, t-butylperoxyallyloxyethyl carbonate, t-amylperoxyallyloxyethyl carbonate, t-hexylperoxyallyloxyethyl carbonate, t-butylperoxymethallyloxyethyl carbonate, t-amylperoxymethallyloxyethyl carbonate, t-hexylperoxymethallyloxyethyl carbonate, t-hexylperoxymethacryloyloxyethyl carbonate, t-butylperoxyacryloyloxyisopropyl carbonate, t-amylperoxyacryloyloxyisopropyl carbonate, t-hexylperoxyacryloyloxyisopropyl carbonate, t-butylperoxymethacryloyloxyisopropyl carbonate, t-amylperoxymethacryloyloxyisopropyl carbonate and t-hexylperoxymethacryloyloxyisopropyl carbonate.

Of these compounds, preferable ones are t-butylperoxyacryloyloxyethyl carbonate, t-butylperoxymethacryloyloxyethyl carbonate, t-butylperoxyallyl carbonate and t-butylperoxymethallyl carbonate.

In the present invention, the inorganic filler (IV) can be used in an amount of 0 to 150 parts by weight based on 100 parts of the components (I)+(II)+(III).

The inorganic filler may be used in granular, lamellar, scaly, needle, spherical, balloons and fibrous forms, and examples of these inorganic fillers include granular fillers such as calcium sulfate, calcium silicate, clay, diatomaceous earth, talc, alumina, siliceous sand, glass powder, iron oxide, metallic powder, graphite, silicon carbide, silicon nitride, silica, boron nitride, aluminum nitride and carbon black; lamellar and scaly fillers such as mica, glass plate, sericite, pyrophyllite, metallic foil, for example, aluminum flake, and graphite; balloon fillers such as Shirasu balloon, metallic balloon, glass balloon and pumice; and mineral fibers such as glass fiber, carbon fiber, graphite fiber, whisker, metallic fiber, silicon carbide fiber, asbestos and wollastonite.

When the content of the filler is in excess of 150 parts by weight, the impact strength of molded articles deteriorates unpreferably.

The surface of the inorganic filler is preferably treated by the use of stearic acid, oleic acid, palmitic acid or a metallic salt thereof, paraffin wax, polyethylene wax or a modified material thereof, an organic silane, an organic borane or an organic titanate.

The thermoplastic composition of the present invention can be prepared by melting/mixing the polyolefin and the polyarylene sulfide at a temperature of 200° to 350° C.

With regard to the order of the melting/mixing of the respective components, all of them may be melted/mixed simultaneously, or alternatively either of the polyolein and the polyarylene sulfide is first melted/mixed with the multi-phase structure thermoplastic resin, and the mixture is then mixed with the other resin.

In melting and mixing, there may be used a usual kneader such as mixing rolls, a Banbury mixer, a pressing kneader, a kneading extruder and a twin-screw extruder.

In the present invention, the following materials can be additionally used, in so far as they do not deviate from the gist of the present invention. Examples of such materials include other thermoplastic resins such as aromatic polyester resin, polyvinyl chloride resin, polyvinylidene chloride resin, polyamide resin, ABS resin, polysulfone resin, natural rubber, synthetic rubber, inorganic flame retardants such as aluminum hydroxide, organic flame retardants containing halogens, phosphorus and the like, organic fillers such as wood meal, and additives such as an antioxidant, an ultraviolet inhibitor, a lubricant, a coupling agent, a dispersant, a foaming agent, a crosslinking agent and a colorant.

Now, the present invention will be described in detail in reference to examples.

Preparation Example 1 [Preparation of Multi-phase Structure Thermoplastic Resin (IIIa)]

In a 5-liter stainless steel autoclave was placed 2,500 g of pure water, and 2.5 g of polyvinyl alcohol was further dissolved therein as a suspending agent. In the solution was then placed 700 g of polypropylene (trade name Nisseki Polypro J130G; made by Nippon Petrochemicals Co., Ltd.), followed by stirring to suspend the polymer therein in a nitrogen atmosphere. Separately, in 300 g of styrene as a vinyl monomer were dissolved 1.5 g of benzoylperoxide as a radical polymerization initiator (trade name Nyper-B; made by Nippon Oils & Fats Co., Ltd.) and 6 g of t-butylperoxymethacryloyloxyethyl carbonate as a radical polymerizable or copolymerizable organic peroxide, and the resulting solution was then placed in the above-mentioned autoclave, followed by stirring.

Afterward, the autoclave was heated up to a temperature of 60° to 65° C., and stirring was then continued for 2 hours, so that the polypropylene was impregnated with the vinyl monomer containing the radical polymerization initiator and the radical polymerizable or copolymerizable organic peroxide. After it had been confirmed that the total amount of the impregnated vinyl monomer, radical polymerizable or copolymerizable organic peroxide and radical polymerization initiator was 50% by weight or more of the original total weight thereof, the temperature of the mixture was raised up to a level of 80° to 85° C, and this temperature was then maintained for 7 hours to complete polymerization, followed by water washing and drying, thereby obtaining a graft polymerization precursor (IIIa').

Next, this graft polymerization precursor was extruded at 200° C. by a plastomill single-screw extruder (Toyo Seiki Seisaku-sho Ltd.) to perform graft reaction, whereby a multi-phase structure thermoplastic resin (IIIa) was obtained.

This multi-phase structure thermoplastic resin was then observed by a scanning type electron microscope (trade name JEOL JSM T300; made by JEOL, Ltd.), and it was found that it was a multi-phase structure thermoplastic resin in which spherical resin particles each having a diameter of 0.3 to 0.4 μm were uniformly dispersed.

In this case, the grafting efficiency of the styrene polymer was 77.1% by weight.

Preparation Example 2 [Preparation of Multi-phase Structure Thermoplastic Resin (IIIb)]

The same procedure as in Preparation Example 1 was repeated with the exception that the 300 g of styrene as the monomer was replaced with 210 g of styrene and 90 g of acrylonitrile as the monomers, in order to prepare the graft polymerization precursor (IIIb'). An active oxygen amount of this precursor was 0.13% by weight, as measured by the iodometry method.

Furthermore, this precursor was extracted through a Soxhlet extractor, and it was confirmed that insoluble matter was not present therein.

Following the same procedure as in Preparation Example 1, the precursor was then kneaded at 180° C. at a revolution of 50 rpm for 10 minutes by the use of a platomill single-screw extruder in order to perform the graft polymerization reaction. The resulting reaction product was then fed to the Soxhlet extractor and the ungrafted copolymer was extracted with ethyl acetate, and in consequence, it was confirmed that graft polymerization efficiency of the resulting styrene/acrylonitrile copolymer was 51% by weight. Moreover, when extraction was made with xylene, it was also confirmed that the insoluble matters were present in a ratio of 12.6% by weight.

Preparation Example 3 [Preparation of Multi-phase Structure Thermoplastic Resin (IIIc)]

The same procedure as in Preparation Example 1 was repeated with the exception that the polypropylene was replaced with ethylene/glycidyl methacrylate copolymer (glycidyl methacrylate content 15% by weight; trade name Rexpearl J-3700; made by Nippon Petrochemicals Co., Ltd.) as an epoxy group-containing olefin copolymer in order to obtain a graft polymerization precursor (IIIc'). The resulting styrene polymer was then extracted from the graft polymerization precursor with ethyl acetate, and when measurement was made by GPC, it was confirmed that a number-average polymerization degree of the styrene polymer was 900.

Afterward, the graft polymerization precursor was extracted at 200° C. by the same procedure as in Preparation Example 1, and graft polymerization reaction was then carried out to prepare a multi-phase structure thermoplastic resin (IIIc). At this time, the graft polymerization efficiency of the styrene polymer was 49.0% by weight.

Preparation Example 4 [Preparation of Multi-phase Structure Thermoplastic Resin (IIId)]

The same procedure as in Preparation Example 3 was repeated with the exception that the ethylene/glycidyl methacrylate copolymer as an epoxy group-containing olefin copolymer was replaced with ethylene/ethyl acrylate copolymer (content of ethyl acrylate 20% by weight; trade name Nisseki Rexlon EEA A-4200; made by Nippon Petrochemicals Co., Ltd.), in order to prepare a multi-phase structure thermoplastic resin (IIId). At this time, a number-average polymerization degree of styrene polymer was 900 and an average particle diameter of the same was from 0.3 to 0.4 μm.

EXAMPLES 1 to 9

In each example, polyphenylene sulfide (hereinafter referred to as "PPS"; trade name Riton R-4; made by Philips Petroleum Co., Ltd.), polypropylene (trade name Nisseki Polypro J620G; made by Nippon Petrochemicals Co., Ltd.) and each of the multi-phase structure thermoplastic resins IIIa and IIIb prepared in Preparation Examples 1 and 2 were melted and mixed in the ratio shown in Table 1.

The melting/mixing process was carried out by feeding the raw materials into a one-directional twin-screw extruder having a screw diameter of 30 mm (Plastic Engineering Laboratory Co., Ltd.) at a cylinder temperature of 280° C, and then melting, mixing and extruding the raw materials. The extruded material was then fed to an injection molding machine having a cylinder temperature of 270° C. and a mold temperature of 80° C. in order to prepare specimens.

Sizes of the specimens and test procedures were as follows:

Specimens for notched izod impact strength: . . . 13 mm × 65 mm × 6 mm (JIS K7110)

Specimens for heat distortion temperature: . . . 13 mm × 128 mm × 6 mm (JIS k7207)

Speciments for flexural modulus: . . . 13 mm × 220 mm × 6 mm (JIS K6758)

TABLE 1

| Example | 1 | 2 | 3 | 4 | 5 | 6 | 7 | 8 | 9 |
|---|---|---|---|---|---|---|---|---|---|
| PPS (pts. wt.) | 90 | 90 | 80 | 70 | 70 | 30 | 30 | 20 | 20 |
| Polypropylene (J620G) (pts. wt.) | 10 | 10 | 20 | 30 | 30 | 70 | 70 | 80 | 80 |
| Multi-Phase Structure Themoplastic Resin (IIIa) (pts. wt.) | 15 | — | 15 | 15 | — | 20 | — | 20 | — |
| Multi-Phase Structure Themoplastic Resin (IIIb) (pts. wt.) | — | 10 | — | — | 10 | — | 20 | — | 20 |
| Notched Izod Impact Strength (kgf/cm—cm) | 8.0 | 7.0 | 9.5 | 11 | 10 | 13 | 11 | 14 | 13 |
| Heat Distortion Temp. (°C.) (18.6 kg/cm$^2$) | 120 | 125 | 120 | 115 | 115 | 92 | 95 | 90 | 93 |
| Flexural Modulus (×10$^3$ kgf/cm$^2$) | 34 | 36 | 32 | 29 | 30 | 20 | 21 | 19 | 20 |

EXAMPLES 10 to 15

The same procedure as in above-mentioned examples was repeated with the exception that a glass fiber (average fiber length 7 μm and average fiber diameter 10 μm) was additionally used. The results are set forth in Table 2.

The results of these examples indicate that when polypropylene is used as the polyolefin, impact resistance can be improved without greatly deteriorating heat resistance and flexural modulus of PPS.

TABLE 2

| Example | 10 | 11 | 12 | 13 | 14 | 15 | Comp. Ex. 1 |
|---|---|---|---|---|---|---|---|
| PPS (pts. wt.) | 80 | 90 | 70 | 70 | 20 | 20 | 100 |
| Polypropylene (J620G) (pts. wt.) | 20 | 20 | 30 | 30 | 80 | 80 | — |
| Multi-Phase | 15 | — | 15 | — | 20 | — | — |

TABLE 2-continued

| Example | 10 | 11 | 12 | 13 | 14 | 15 | Comp. Ex. 1 |
|---|---|---|---|---|---|---|---|
| Structure Themoplastic Resin (IIIa) (pts. wt.) | | | | | | | |
| Multi-Phase Structure Themoplastic Resin (IIIb) (pts. wt.) | — | 10 | — | 10 | — | 20 | — |
| Glass Fiber (pts. wt.) | 30 | 30 | 30 | 30 | 30 | 30 | — |
| Notched Izod Impact Strength (kgf/cm—cm) | 9.5 | 10 | 11 | 11.5 | 12 | 10 | 2.8 |
| Heat Distortion Temp. (°C.) (18.6 kg/cm$^2$) | 245 | 230 | 180 | 200 | 140 | 135 | 130 |
| Flexural Modulus (×10$^3$ kg/cm$^2$) | 93 | 91 | 80 | 78 | 39 | 41 | 37 |

Amount of glass fiber: Parts by weight based on 100 parts by weight of (PPS + PP + multi-phase structure thermoplastic resin).

EXAMPLES 16 to 20

The same procedure as in the above-mentioned examples was repeated with the exception that a low-density polyethylene (trade name Nisseki Rexlon J40; made by Nippon Petrochemicals Co., Ltd.), the ethylene/ethyl acrylate used in Preparation Example 4 and ultralow-density polyethylene (trade name Nisseki Softrex D9010; Nippon Petrochemicals Co., Ltd.) were employed as polyolefins and that the multi-phase structure thermoplastic resins obtained in Preparation Examples 3 and 4 were employed. The results are set forth in Table 3.

TABLE 3

| Example | 16 | 17 | 18 | 19 | 20 |
|---|---|---|---|---|---|
| PPS (pts. wt.) | 90 | 90 | 90 | 70 | 70 |
| Low-density Polyethylene (pts. wt.) | 10 | — | — | 30 | — |
| Ethylene/Ethyl Acrylate Copolymer (pts. wt.) | — | 10 | — | — | — |
| Ultralow-Density Polyethylene (pts. wt.) | — | — | 10 | — | 30 |
| Multi-Phase Structure Themoplastic Resin (IIIc) (pts. wt.) | 15 | — | — | 10 | — |
| Multi-Phase Structure Themoplastic Resin (IIId) (pts. wt.) | — | 15 | 15 | — | 10 |
| Notched Izod Impact Strength (kgf/cm—cm) | 20 | 25 | 30 | 32 | 40 |
| Heat Distortion Temp. (°C.) (18.6 kgf/cm$^2$) | 105 | 100 | 100 | 93 | 95 |
| Flexural Modulus (×10$^3$ kg/cm$^2$) | 26 | 24 | 25 | 21 | 22 |

COMPARATIVE EXAMPLES 2 to 6

The same procedure as in the above-mentioned examples was repeated with the exception that the multi-phase structure thermoplastic resin (IIIa) or (IIIb) was replaced with maleic anhydride-modified polypropylene (addition amount of maleic anhydride 0.15% by weight). The results are set forth in Table 4.

TABLE 4

| Comp. Example | 2 | 3 | 4 | 5 | 6 |
|---|---|---|---|---|---|
| PPS (pts. wt.) | 90 | 80 | 70 | 30 | 20 |
| Polypropylene J620G (pts. wt.) | 10 | 20 | 30 | 70 | 80 |
| Modified Polypropylene (pts. wt.) | 15 | 15 | 15 | 15 | 15 |
| Notched Izod Impact Strength (kgf/cm—cm) | 6.5 | 7.5 | 8.0 | 8.5 | 8.0 |
| Heat Distortion Temp. (°C.) (18.6 kgf/cm$^2$) | 110 | 100 | 95 | 90 | 85 |
| Flexural Modulus (×10$^3$ kg/cm$^2$) | 25 | 21 | 19 | 16 | 16 |

COMPARATIVE EXAMPLES 7 to 12

The same procedure as in Examples 16 to 20 was repeated with the exception that the multi-phase structure thermoplastic resins (IIIc) and (IIId) were replaced with the ethylene/glycidyl methacrylate copolymer obtained in Preparation Example 3 and maleic anhydride-modified ethylene/ethyl acrylate copolymer (addition amount of maleic anhydride 0.2% by weight). The results are set forth in Table 5.

TABLE 5

| Comp. Example | 7 | 8 | 9 | 10 | 11 | 12 |
|---|---|---|---|---|---|---|
| PPS (pts. wt.) | 100 | 90 | 90 | 90 | 80 | 80 |
| Low-density Polyethylene (pts. wt.) | — | 10 | — | 10 | 20 | — |
| Ethylene/Ethyl Acrylate Copolymer (pts. wt.) | — | — | 10 | — | — | 20 |
| Modified Ethylene/Ethyl Acrylate Copolymer (pts. wt.) | — | — | 15 | — | — | 15 |
| Ethylene/Glycidyl Methacrylate Copolymer (pts. wt.) | 20 | 15 | — | 20 | 15 | — |
| Notched Izod Impact Strength (kgf/cm—cm) | 2.0 | 2.1 | 1.9 | 2.0 | 1.8 | 1.9 |
| Heat Distortion Temp. (°C.) (18.6 kgf/cm$^2$) | 103 | 97 | 95 | 95 | 93 | 95 |
| Flexural Modulus (×10$^3$ kg/cm$^2$) | 32 | 30 | 28 | 28 | 26 | 27 |

According to the present invention, the following functional effects can be obtained.

The thermoplastic resin composition of the present invention retains inherent features of the polyolefin and the polyarylene sulfide, and therefore it is excellent in heat resistance, impact resistance and moldability.

In consequence, the composition of the present invention can be widely used as materials of, for example, automobile parts, electric and electronic parts, and other industrial parts.

What is claimed is:

1. A thermoplastic resin composition prepared by blending
   (I) 50 to 1% by weight based on the weight of components I and II of a polypropylene,
   (II) 50 to 99% by weight based on the weight of components I and II of a polyarylene sulfide,
   (III) 0.1 to 100 parts by weight, based on 100 parts by weight of the aforesaid components (I)+(II), of a compatibilizing agent which is a graft copolymer comprising 5 to 95% by weight of an olefin polymer or copolymer component selected from the group consisting of polypropylene, ethylene-glycidyl methacrylate copolymer and ethylene-ethylacrylate copolymer and 95 to 5% by weight of a vinyl polymer or copolymer component, different from said olefin polymer or copolymer component, obtained by polymerizing at least one vinyl monomer selected from the group consisting of vinyl aromatic monomers, vinyl ester monomers, and (meth)acrylonitrile monomer, one of said components being in the state of a dispersion phase having a particle diameter of 0.001 to 10 μm in the other of said components, said graft copolymer prepared by melting a graft polymerization precursor obtained by copolymerizing at least one said vinyl monomer with at least one radical polymerizable organic peroxide represented by the following general formula (a) and (b)

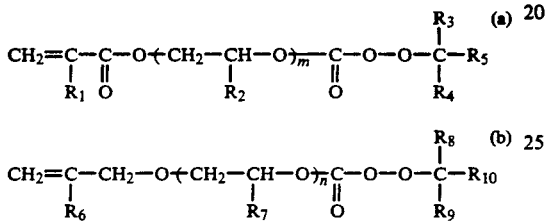

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$, and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 0, 1 or 2, and n is 0, 1 or 2, in particles of said olefin polymer or copolymer selected from the group consisting of polypropylene, acrylate copolymer, and (IV) 0 to 150 parts of inorganic filler based on 100 parts by weight of said components (I)+(II)+(III).

2. The thermoplastic resin composition according to claim 1 wherein said ethylene glycidyl methacrylate copolymer is composed of 60 to 99.5% by weight of ethylene and 40 to 0.5% by weight of glycidyl methacrylate.

3. The thermoplastic resin composition according to claim 1 wherein said vinyl polymer or copolymer is the polymerization product of 50% by weight or more of vinyl aromatic monomer.

4. The thermoplastic resin composition according to claim 1 wherein said vinyl monomer is at least one (meth) acrylate monomer.

5. The thermoplastic resin composition according to claim 1 wherein said graft copolymer (III) comprises 20 to 90% by weight of said olefin polymer or copolymer and 80–10% by weight of said vinyl polymer or copolymer.

6. The thermoplastic resin composition according to claim 5 wherein said polyarylene sulfide is polyphenylene sulfide.

7. The thermoplastic resin composition according to claim 6 wherein said particle diameter is 0.01 to 5 μm.

8. The thermoplastic resin composition according to claim 7 wherein said vinyl monomer comprises styrene.

* * * * *